Jan. 25, 1949.                    G. E. BERGGREN                    2,459,863
                    METHOD OF ELECTRICAL BRAZING OF CONDUCTORS
Filed Nov. 10, 1944                                          2 Sheets-Sheet 1
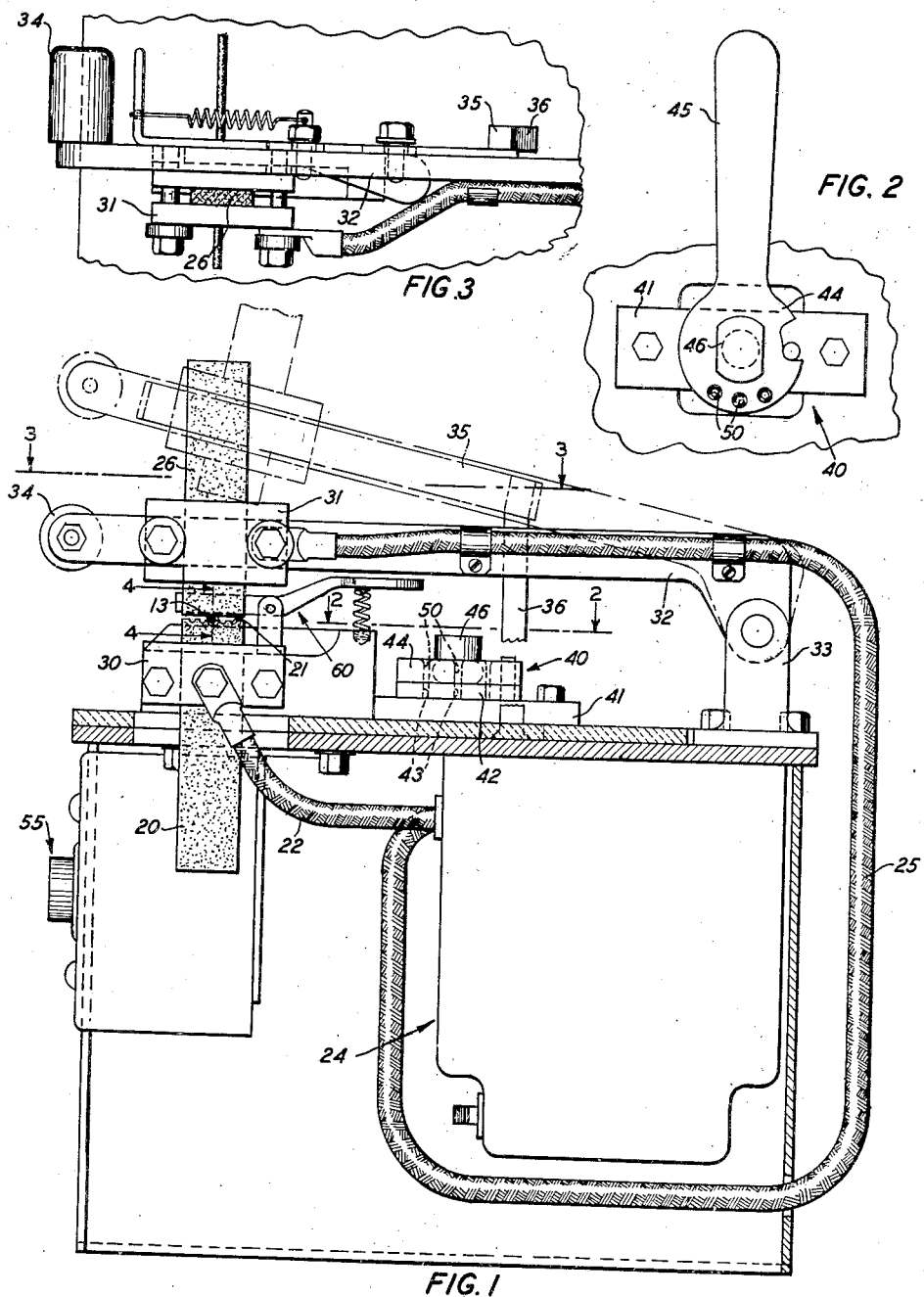
INVENTOR
G. E. BERGGREN
BY
ATTORNEY Jan. 25, 1949. G. E. BERGGREN 2,459,863
METHOD OF ELECTRICAL BRAZING OF CONDUCTORS
Filed Nov. 10, 1944 2 Sheets-Sheet 2
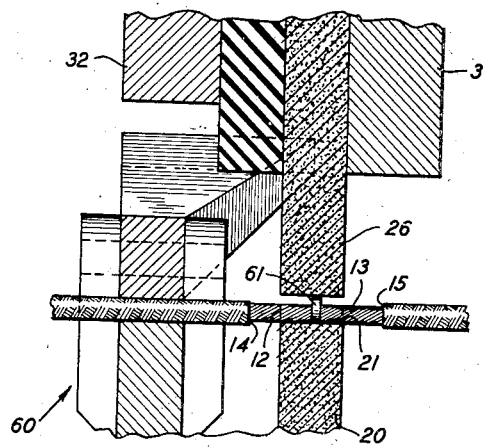
FIG. 4
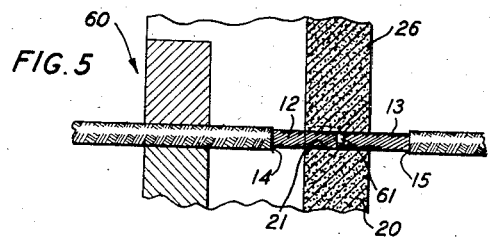
FIG. 5
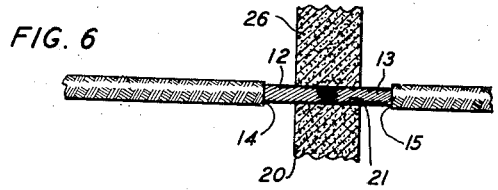
FIG. 6
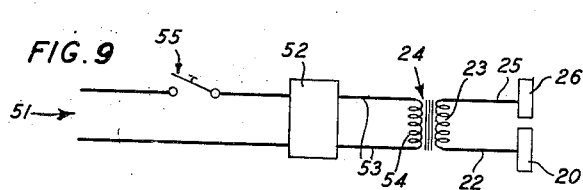
FIG. 9
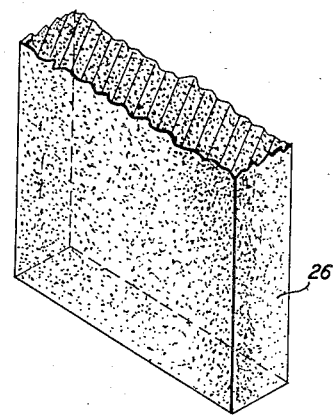
FIG. 7
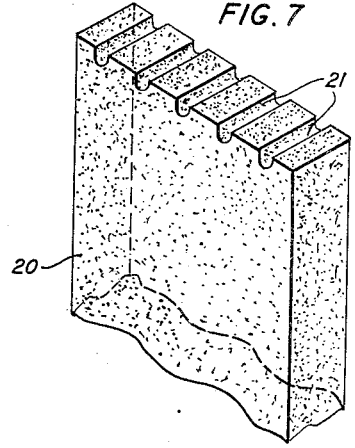
FIG. 8
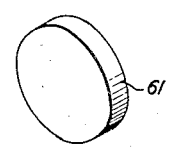
INVENTOR
G. E. BERGGREN
BY
ATTORNEY Patented Jan. 25, 1949

2,459,863

UNITED STATES PATENT OFFICE 2,459,863

METHOD OF ELECTRICAL BRAZING OF CONDUCTORS

George E. Berggren, Baltimore, Md., assignor to Western Electric Company, Incorporated, New York, N. Y., a corporation of New York Application November 10, 1944, Serial No. 562,848

2 Claims. (Cl. 219—12)

This invention relates to methods of brazing articles, and more particularly to methods of brazing electrical conductors.

In the manufacture of electrical conductors, it is often necessary to splice the conductors by brazing. To obtain strong splices by brazing, the brazing material must be heated to a high temperature, but the conductors should not be heated to a temperature which would cause them to become brittle or be fully annealed if they are tempered. Also, if the conductors are heated to a very high temperature during the brazing thereof, they oxidize, and if insulating jackets are on the conductors, there is danger of melting or burning the portions of the insulating jacket thereon adjacent to the portions of the conductors being brazed.

In brazing conductors with silver solder, it is necessary that the silver solder be heated at a relatively high temperature until it is molten. It is desirable to heat the portions of the conductors to be brazed to a temperature sufficiently high to form a good joint, but to limit the temperature of these portions so that the strength of the conductors will not be altered materially, and the adjacent portions of the conductors will not be heated sufficiently to damage any insulating jackets thereon.

An object of the invention is to provide new and improved methods of brazing articles.

One method embodying the invention comprises positioning a mass of brazing material between two metal articles to be brazed together, heating the mass of brazing material to a brazing temperature, and then heating the portions of the articles adjacent to the heated mass of brazing material to a brazing temperature.

A complete understanding of the invention may be obtained from the following detailed description of a method forming one embodiment thereof, when read in conjunction with the appended drawings, in which:

Fig. 1 is a vertical, sectional view of an apparatus suitable for use in practicing a method of embodying the invention;

Fig. 2 is an enlarged, fragmentary, horizontal sectional view of a portion of the apparatus taken along line 2—2 of Fig. 1;

Fig. 3 is a fragmentary, horizontal sectional view of a portion of the apparatus taken along line 3—3 of Fig. 1;

Fig. 4 is an enlarged, fragmentary, vertical sectional view of a portion of the apparatus taken along line 4—4 of Fig. 1, and showing one stage in a brazing operation;

Fig. 5 is a view similar to Fig. 4 showing another stage in a brazing operation;

Fig. 6 is another view similar to Fig. 4 showing still another stage in a brazing operation;

Fig. 7 is an enlarged, fragmentary, exploded, perspective view of a pair of electrodes forming a part of the apparatus;

Fig. 8 is an enlarged perspective view of a disc of brazing material to be used in a method embodying the invention, and Fig. 9 is a diagrammatic view of an electric circuit comprising a part of the apparatus.

Referring more in detail to the drawings, there is shown therein an apparatus for performing a method of brazing embodying the invention. This apparatus is designed to splice together the ends of insulated or uninsulated conductors, which may be solid or stranded. For purposes of illustration, there is described hereinbelow the method of brazing stranded conductors 12 and 13 having insulating jackets 14 and 15, respectively, thereon.

A stationary carbon electrode 20 (Figs. 1 and 7) having a plurality of arcuate grooves 21—21 formed therein is connected by a conductor 22 to a secondary winding 23 (Fig. 9) of a transformer 24, and a conductor 25 connects a movable carbon electrode 26 to the secondary winding 23 of the transformer 24. A fixed electrode holder 30 (Fig. 1) serves to mount the carbon electrode 20 rigidly, and an electrode holder 31 fixed to an arm 32 serves to mount the carbon electrode 26 on the arm. The arm 32 is pivotally attached at one end thereof to a bracket 33 and is provided with a handle 34 at the free end thereof. A manually operable, spring-pressed latch 35 (Figs. 1 and 3) mounted on the arm cooperates with a stop 36 to maintain the arm in its dotted line position, as shown in Fig. 1, when the apparatus is not in use. The latch may be released and the arm pivoted in a counterclockwise direction, as viewed in Fig. 1, when desired. The weight of the arm and the electrode 26 move the electrode 26 toward the electrode 20 when the latch is released.

A wire trimmer 40 (Figs. 1 and 2) includes a supporting plate 41 having fixed thereto a disc 42, which is provided with bores 43—43 therein. A disc 44 having a handle 45 formed thereon is mounted pivotally above the disc 42 by a bolt 46, and has formed therein bores 50—50, which may be aligned with the bores 43—43, which are just large enough to receive the conductors 12 and 13 therein. To trim the ends of the conductors 12 and 13 (Fig. 4), the disc 40 (Fig. 2) is moved to a position in which the bores 50—50 are aligned with the bores 43—43, the conductor 12 is inserted into a pair of the aligned bores and the disc 44 is rotated relative to the disc 42, whereby the portion of the conductor 12 projecting into the bore 43 is severed neatly from the portion of the conductor positioned in the bore 50. This operation is repeated with the conductor 13. After the ends of the conductors 12 and 13 have been trimmed, the ends are clean and are flat and perpendicular to the axes of the conductors so that they will form a tight and short splice.

A constant voltage power line 51 (Fig. 9) serves to supply current to an electronic timer 52 of standard construction, which is connected by conductors 53—53 to a primary winding 54 of the transformer 24, and has a manually operable, normally open, push-button switch 55 therein. When the push-button switch 55 is closed, the timer 52 and the primary winding 54 of the transformer are energized, whereby the secondary winding 23 of the transformer is energized and a potential is impressed upon the electrodes 20 and 26. After the switch 55 has been closed for a short, predetermined period of time, the timer 52 serves to break the circuit to the transformer 24, whereby the electrodes 20 and 26 receive no more power.

A spring-pressed clamp 60 positioned adjacent to the electrode 20 serves to hold the conductor 12 in the position shown in Fig. 4 of the drawings, in which position the end of the conductor 12 rests in one of the grooves 21—21 in the electrode 20. A disc 61 of silver solder also is positioned in the groove 21 so that one face thereof abuts the trimmed end of the conductor 12. The disc, which is of a predetermined size, has a diameter slightly greater than the diameter of the conductors 12 and 13, and therefore projects somewhat above the conductor 12 resting in the groove 21.

To braze the ends of the conductors 12 and 13 (Fig. 4) together, they are trimmed by means of the wire trimmer 40 (Fig. 2), and the conductor 12 (Fig. 4) is clamped in the clamp 60 with the trimmed end thereof extending about half way through one of the grooves 21—21 formed in the electrode 20. The disc 61 of silver solder then is pressed against the end of the conductor 12 and the conductor 13 is placed in the position shown in Fig. 4 of the drawings, in which position the end of the trimmed conductor 13 rests in the groove 21 containing the disc 61 and abuts the disc. The operator presses the conductor core 13 toward the disc 61 and the core 12 and maintains this pressure. At this time, the conductors 12 and 13 lie in the bottom of the groove 21 and the disc 61, which is slightly larger in diameter than the conductor cores, projects slightly above the upper portions of the conductor cores somewhat in the manner shown in Fig. 4.

The latch 35 (Fig. 1) then is released and the arm 32 and the electrode 26 are moved downwardly until the electrode 26 engages the upper surface of the disc 61 (Fig. 4), which holds the electrode 26 out of contact with the conductors 12 and 13. The push-button switch 55 (Figs. 1 and 9) then is closed, whereby current is supplied to the electrodes 20 (Fig. 4) and 26 and flows through the disc 61. Since the electrode 26 does not contact the conductors 12 and 13, current does not flow through the conductors at this time. The current flowing through the disc 61 melts the disc and the conductor 13, which is pressed against the disc 61, moves toward the conductor 12 as the disc 61 melts.

As the disc 61 melts, the molten solder flows around the end portions of the conductors 12 and 13 and into the interstices between the strands thereof, and the weight of the arm 32 and the electrode 26 moves the electrode into engagement with the conductors 12 and 13, as shown in Figs. 5 and 6. Current then flows through the end portions of the conductors 12 and 13, whereby the end portions of the conductors are heated for a short period of time to provide good bonds between them and the melted disc. The timer 52 then breaks the circuit to the electrodes.

The timer 52 (Fig. 9) is set so that the disc 61 (Fig. 5) will be melted and the electrode 26 will contact the conductors 12 and 13 only for a period of time sufficient to heat the ends of the conductors 12 and 13 to a temperature high enough to make rigid bonds between the conductors and the silver solder of the disc 61 without heating the conductors 12 and 13 to such an extent that the temper thereof will be destroyed or the insulating covers 14 and 15 are burned by the heat of the conductors.

In practicing a specific method embodying the invention to braze stranded conductors of a diameter of .0456 inch, a disc of silver solder of a thickness of .0015 inch and a diameter of .0625 inch is very satisfactory. The period of time in which current is supplied to the electrodes for brazing such conductors is slightly less than ½ of one second and the electrodes are subjected to a potential difference of about 5 volts. The above-described values should be varied suitably for brazing conductors of different sizes.

As the disc 61 (Fig. 5) is melted and the conductor 13 is pressed toward the conductor 12, the conductor 13 is moved toward the conductor 12 and a very short, stiff splice section will be formed. The silver solder flows around the ends of the conductor cores, but is of such a small quantity that the resultant joint is very little larger than the conductors.

By practicing the above-described method of brazing conductors, very neat and strong brazed joints may be formed without injuring either the conductors or the insulating jackets surrounding the conductors. At the same time the joints are of substantially the same diameter as the conductors themselves.

What is claimed is:

1. The method of brazing stranded electrical conductors of predetermined shape, which comprises clamping a stranded electrical conductor in contact with the bottom of a groove formed in an electrode and having the shape of the conductor, pressing a preformed disc of brazing material of a diameter greater than that of the conductor and a predetermined mass in the groove against the end of the conductor, holding the end of a second stranded conductor against the opposite side of the disc and in contact with the bottom of the groove, pressing a second electrode against the periphery of the preformed disc with a predetermined amount of pressure, and passing a predetermined amount of current from one of the electrodes to the other electrode for a predetermined period of time, whereby the current initially flows through only the disc of brazing material and melts the brazing material, the second electrode moves into contact with the end portions of the conductors as the brazing material melts and flows into the interstices between the strands of the conductors, and a current flows through the ends of the conductors after the second electrode has moved into an engagement therewith, whereby a brazed joint is formed of the same diameter as that of the stranded conductors.

2. The method of brazing stranded electrical conductors of predetermined contour, which comprises clamping a stranded electrical conductor in contact with the bottom of a groove formed in a fixed electrode and having the contour of the conductors, pressing a preformed slug of brazing material having a cross sectional area greater than that of the conductor and of a predetermined mass against the end of the conductor, holding the end of a second stranded electrical conductor against the opposite side of the slug and in contact with the electrode, pressing a second electrode against the periphery of the preformed slug with a predetermined amount of pressure, and passing a predetermined amount of current from one electrode to the other electrode for a predetermined period of time, whereby the current sequentially flows through the slug of brazing material and through the end portions of the conductors to melt the slug and cause the molten brazing material to flow into the interstices between the stranded conductors to form a brazed joint of the same cross sectional area as that of the stranded conductors.

GEORGE E. BERGGREN.

REFERENCES CITED

The following references are of record in the file of this patent:

UNITED STATES PATENTS

| Number | Name | Date |
|---|---|---|
| 396,015 | Thomson | Jan. 8, 1889 |
| 1,040,418 | Reitzel | Oct. 8, 1912 |
| 1,332,670 | Lachman | Mar. 2, 1920 |
| 1,640,798 | Murray | Aug. 30, 1927 |

OTHER REFERENCES

Welding Handbook, 1942, pages 392, 395 and 396 (American Welding Society, 33 West 39th Street, New York, New York.

Certificate of Correction

Patent No. 2,459,863. January 25, 1949.

GEORGE E. BERGGREN

It is hereby certified that error appears in the printed specification of the above numbered patent requiring correction as follows:

Column 4, line 60, claim 1, for the words "and a" read *and of a*;

and that the said Letters Patent should be read with this correction therein that the same may conform to the record of the case in the Patent Office.

Signed and sealed this 1st day of November, A. D. 1949.

[SEAL]

THOMAS F. MURPHY,
*Assistant Commissioner of Patents.*